US009374478B1

(12) United States Patent
Li

(10) Patent No.: US 9,374,478 B1
(45) Date of Patent: Jun. 21, 2016

(54) ADAPTIVE IMAGE SHARPENING

(71) Applicant: Marvell International Ltd., Hamilton (BM)

(72) Inventor: Huai Dong Li, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/522,443

(22) Filed: Oct. 23, 2014

Related U.S. Application Data

(60) Provisional application No. 61/911,113, filed on Dec. 3, 2013, provisional application No. 61/946,356, filed on Feb. 28, 2014.

(51) Int. Cl.
| | | |
|---|---|---|
| H04N 1/00 | (2006.01) | |
| H04N 1/409 | (2006.01) | |
| G06T 5/00 | (2006.01) | |
| G06T 5/20 | (2006.01) | |
| H04N 101/00 | (2006.01) | |

(52) U.S. Cl.
CPC ............ *H04N 1/00204* (2013.01); *G06T 5/003* (2013.01); *G06T 5/20* (2013.01); *H04N 1/4092* (2013.01); *H04N 2101/00* (2013.01); *H04N 2201/0084* (2013.01)

(58) Field of Classification Search
CPC ............ G06T 5/004; G06K 9/40; H04N 5/14; H04N 5/91; H04N 1/3224; H04N 1/409; H04N 1/4092; H04N 1/58; H04N 1/62; H04N 7/0142
USPC .......................................................... 348/252
See application file for complete search history.

(56) References Cited

U.S. PATENT DOCUMENTS

| | | | | |
|---|---|---|---|---|
| 7,283,680 B2 * | 10/2007 | Cheng | ..................... | G06T 5/004 348/625 |
| 8,805,114 B2 * | 8/2014 | Zhai | ......................... | G06T 5/20 382/254 |
| 2004/0041920 A1 * | 3/2004 | Mizukami | .............. | H04N 1/603 348/222.1 |
| 2005/0008249 A1 * | 1/2005 | Cheng | ..................... | G06T 5/004 382/264 |
| 2005/0008251 A1 * | 1/2005 | Chiang | ................... | G06T 5/003 382/266 |
| 2008/0012955 A1 * | 1/2008 | Johnson | ................. | G02B 27/46 348/222.1 |
| 2008/0101716 A1 * | 5/2008 | Ho | .......................... | G06T 5/004 382/266 |
| 2008/0298704 A1 * | 12/2008 | Nachlieli | ................ | G06T 5/003 382/254 |
| 2009/0245639 A1 * | 10/2009 | Erdler | ....................... | G06T 5/20 382/173 |
| 2011/0115950 A1 * | 5/2011 | Wach | ..................... | H04N 5/335 248/241 |
| 2011/0150349 A1 * | 6/2011 | Kojima | ............. | G06K 9/00228 382/224 |
| 2012/0093433 A1 * | 4/2012 | Gupta | ..................... | G06T 5/007 382/260 |
| 2014/0147057 A1 * | 5/2014 | Zhai | ......................... | G06T 5/20 382/266 |

* cited by examiner

*Primary Examiner* — Pritham Prabhakher

(57) ABSTRACT

Some of the embodiments of the present disclosure provide a method comprising receiving image data generated by an imaging device. The image data represents an image captured by the imaging device and the image includes image edges. The method further comprises receiving sensor data related to sensor gain used by the imaging device for capturing the image, and adjusting the image data to modify sharpness of the image edges of the image. The adjusting is based, at least in part, on the sensor data.

20 Claims, 6 Drawing Sheets

ADAPTIVE IMAGE SHARPENING

CROSS REFERENCE TO RELATED APPLICATIONS

This claims priority to U.S. Provisional Patent Application No. 61/911,113, filed on Dec. 3, 2013, and to U.S. Provisional Patent Application No. 61/946,356, filed on Feb. 28, 2014, which are incorporated herein by reference.

TECHNICAL FIELD

Embodiments of the present disclosure relate to image processing, and more particularly to sharpening features of an image.

BACKGROUND

Unless otherwise indicated herein, the approaches described in this section are not prior art to the claims in the present disclosure and are not admitted to be prior art by inclusion in this section.

Edge enhancement is one of several techniques for sharpening features in an image. Generally, an image includes objects bordered by regions where color, brightness, hue, contrast, and other characteristics of the image change. Such regions, which may be over relatively wide or narrow portions of the image, are called edges. Sharpening can mitigate image blur that may arise from imperfections of an optical portion (e.g., lens and/or mirrors) and an electronic portion of an imaging system. The visual appearance of an image can be significantly improved by enhancing edges and other details of the image. A number of general approaches used to sharp features of an image include applying a high pass filter to image data to extract high frequency image components, which are scaled by a gain and added back to the original image data to produce a sharpened image. Unfortunately, a high-pass filter is sensitive to noise, so any noise in the image or any artifacts resulting from image processing can be amplified. Other drawbacks that arise may include undesirable overshoot artifacts or halo artifacts due to over-sharpening of high contrast edges of the image.

SUMMARY

In various embodiments, the present disclosure provides a method comprising receiving image data generated by an imaging device. The image data represents an image captured by the imaging device, and the image includes image edges. The method further comprises receiving sensor data used by the imaging device for capturing the image and based, at least in part, on the sensor data, adjusting the image data to modify sharpness of the image edges of the image. Sensor gain may be related to the sensor data, and the sensor gain may comprise analog gain, digital gain, or integration time used by the imaging device for capturing the image. The method may further comprise applying a first low pass filter to the image data to generate first modified image data, applying a second low pass filter to the image data to generate second modified image data, and generating band-pass image data based, at least in part, on a difference between the first modified image data and the second modified image data, wherein the first low pass filter and the second low pass filter have frequency responses different from one another. Adjusting the image data to modify sharpness of the image edges of the image may further be based, at least in part, on image gray-scale of portions of the image. The method may further comprise classifying one or more portions of the image based, at least in part, on smoothness, texture, or contrast of the one or more portions of the image, and adjusting the image data to modify sharpness of the image edges of the image based, at least in part, on the classifying. The method may further comprise detecting skin tone in one or more portions of the image and based, at least in part, on the detected skin tone, adjusting the image data to modify sharpness of the image edges of the image. Adjusting the image data to modify sharpness of the image edges of the image may further be based, at least in part, on human visual response and contrast of one or more portions of the image.

In some embodiments, a system comprises an imaging device and a processor configured to: receive image data generated by the imaging device, wherein the image data represents an image captured by the imaging device, and wherein the image includes image edges; receive sensor data used by the imaging device for capturing the image; and adjust the image data to modify sharpness of the image edges of the image, wherein the adjusting is based, at least in part, on the sensor data.

In some embodiments, a computer-readable storage medium storing computer-executable instructions that, when executed by a processor, configure the processor to perform operations comprising: receiving image data generated by an imaging device, wherein the image data represents an image captured by the imaging device, and wherein the image includes image edges; receiving sensor data used by the imaging device for capturing the image; and based, at least in part, on the sensor data, adjusting the image data to modify sharpness of the image edges of the image.

BRIEF DESCRIPTION OF THE DRAWINGS

In the following detailed description, reference is made to the accompanying drawings, wherein like numerals designate like parts throughout. The drawings illustrate a number of embodiments that illustrate principles of the present disclosure. It is to be understood that other embodiments may be utilized and structural or logical changes may be made without departing from the scope of the present disclosure. Therefore, the following detailed description is not to be taken in a limiting sense, and the scope of embodiments in accordance with the present disclosure is defined by the appended claims and their equivalents.

DETAILED DESCRIPTION

In embodiments, techniques and systems allow for sharpening of features of an image during image processing based, at least in part, on a dynamic gain value that can vary with any of a number of parameters. Examples of such parameters include contrast of image features, skin tone of image features, and other parameters based on the human visual system. Image features may comprise any portion(s) of an image that includes edges or borders among areas of differing contrast, color, brightness, hue, texture, and so on. For example, a portion of a portrait of a person may be an image feature that has edges of, among other things, brightness and contrast between the person's chin and neck.

A dynamic gain value may comprise a multiplier or factor applied to image data to sharpen features of the image represented by the image data. The dynamic gain value may vary with position across the image. For example, a dynamic gain value for one portion of an image may be different from a dynamic gain value for another portion of the image. Such a dynamic gain value, which can be different for different portions of an image, can provide better control of image sharpening, as compared to the case where a fixed gain value is applied to image data for an entire image.

In some embodiments, an amount of image sharpening applied to a portion of an image may depend, at least in part, on the amount of noise associated with the image. Such noise may, for example, be generated by the imaging device (e.g., camera) that captured the image. Because the amount of image sharpening is concomitant with a dynamic gain value (e.g., an amplification value), noise present in image data may be amplified to undesirable levels if image sharpening is performed to a high degree. To mitigate excessive image noise artifacts arising from amplifying noise, amounts of image sharpening for portions of an image may vary with the amounts of noise associated with the individual portions of the image. Thus, image sharpening may be reduced for portions of an image associated with a relatively large amount of noise as compared to image sharpening for portions of an image associated with a relatively small amount of noise.

Figure 1:
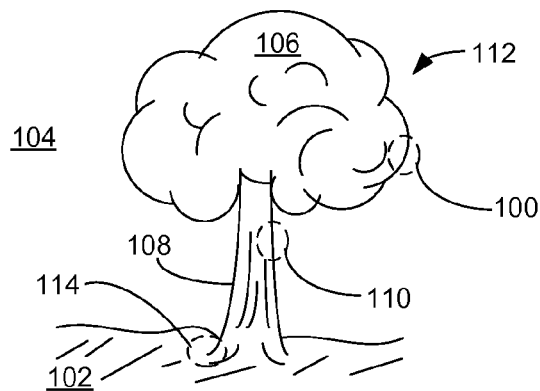
FIG. 1 illustrates an image that includes edges, according to some embodiments.

FIG. 1 illustrates an example image that includes a number of image features having edges, according to some embodiments. The image may be generated by an imaging device that includes an optical portion, such as lenses, and an electrical portion, such as charged-coupled devices (CCDs), a processors, memory, and so on (not illustrated in FIG. 1). In particular, the image includes a tree 100, the ground 102, and background 104, which may be the sky or distant objects, for example. Tree 100 includes a canopy 106 of leaves and a trunk 108. As mentioned previously, image features may be any portion(s) of an image that includes edges or borders among areas of differing contrast, color, brightness, hue, texture, and so on. For example, any portion of the image of tree 100 may be an image feature that has edges of, among other things, color and contrast between the tree trunk and background. A process of image sharpening may result in reduced blur of such edges.

Though any number of image edges can be identified in any order, for sake of convenience the following description labels some of the image edges as "first", "second", and "third". For example, a first image edge 110 may be the edge of trunk 108 with background 104. First image edge 110 may span across a region of the image that includes differing image parameters, such as color, texture, hue, contrast, brightness, and so on. In particular, trunk 108 may be brown and dark while background 104 may be blue and bright. As another example, a second image edge 112 may be the edge of canopy 106 with background 104. Second image edge 112 may span across a region of the image that includes differing image parameters. In particular, canopy 106 may be green with a granulated texture while background 104 may be blue with a smooth texture. For yet another example, a third image edge 114 may be the edge of trunk 108 with ground 102. Third image edge 114 may span across a region of the image that includes differing image parameters. In particular, trunk 108 may have a have hue and contrast different from that of ground 102.

Figure 2:
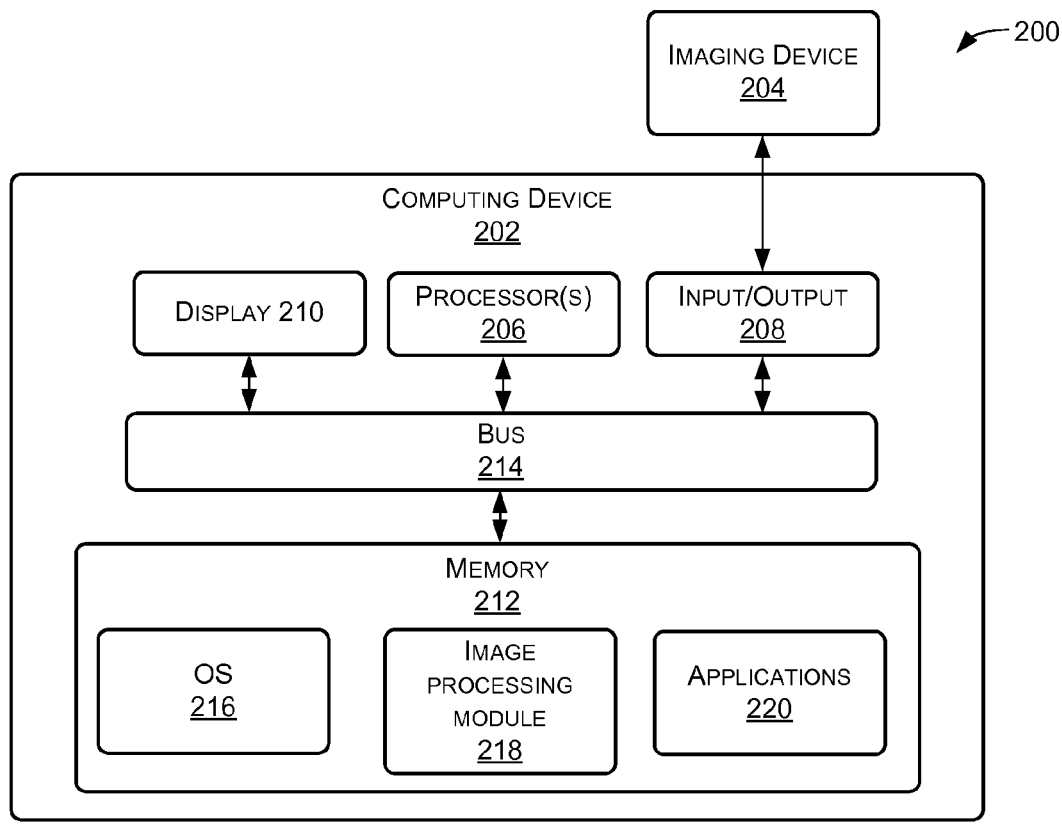
FIG. 2 is a block diagram of a host system or computing device, according to some embodiments.

FIG. 2 is a block diagram of a system 200 including a computing device 202, in which embodiments involving image processing as described herein may be implemented. System 200 may also include an imaging device 204. Computing device 200 may comprise any type of device that includes one or multiple processors 206 operably connected to an input/output (I/O) interface 208, display 210, and memory 212, e.g., via a bus 214. Computing device 202 can include personal computers such as, for example, desktop computers, laptop computers, tablet computers, telecommunication devices, personal digital assistants (PDAs), electronic book readers, wearable computers, automotive computers, gaming devices, etc. In some embodiments, computing device 202 can include, for example, components for integration in a computing device, appliances, or another sort of device. In some embodiments, some or all of the functionality described as being performed by computing device 202 may be implemented by one or more remote peer computing devices, a remote server or servers, or a cloud computing resource. For example, computing device 202 can execute applications that are stored remotely from the computing devices.

In some implementations, computing device 202 and imaging device 204 may comprise a single device or package. In other implementations, computing device 202 and imaging device 204 may comprise separate devices or packages. In such a case, imaging device may include its own computing device that is external from computing device 202. Imaging device 204 may include any number of optical components, sensors, and various electronics. For example, such sensors may include an ambient light intensity detector.

In some embodiments, memory 212 can store instructions executable by the processor(s) 206 including an operating system (OS) 216, an image processing module 218, and programs or applications 220 that are loadable and executable by processor(s) 206. Processor(s) 206 may include central processing units (CPUs), graphics processing units (GPUs), video buffer processors, and so on. In some implementations, image processing module 218 comprises executable code stored in memory 212 and is executable by processor(s) 206.

Though certain modules have been described as performing various operations, the modules are merely one example and the same or similar functionality may be performed by a greater or lesser number of modules. Moreover, the functions performed by the modules depicted need not necessarily be performed locally by a single device. Rather, some operations could be performed by a remote device (e.g., peer, server, cloud, etc.).

Alternatively, or in addition, the functionality described herein can be performed, at least in part, by one or more hardware logic components. For example, and without limitation, illustrative types of hardware logic components that can be used include Field-programmable Gate Arrays (FP-GAs), Program-specific Integrated Circuits (ASICs), Program-specific Standard Products (ASSPs), System-on-a-chip systems (SOCs), Complex Programmable Logic Devices (CPLDs), etc.

In some embodiments, memory 212 can include one or a combination of computer readable media. Computer readable media may include computer storage media and/or communication media. Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media. In various embodiments, memory 212 is an example of a computer storage medium storing computer-executable instructions that, when executed by processor(s) 206, configure the processor(s) to, among other things, receive image data generated by imaging device 204, wherein the image data represents an image captured by the imaging device; receive sensor data representative of sensor gain used by the imaging device for capturing the image; and adjust the image data to modify sharpness of the image edges of the image, wherein the adjusting is based, at least in part, on the sensor data.

Computing device 202 can include one or more input/output interfaces 208 to allow computing device 202 to communicate with other devices. For example, input/output interface 208 may be configured to receive image data from imaging device 204. In various embodiments, input/output interfaces 208 can comprise touch input devices such as a direct-touch input device (e.g., a touch screen) or an indirect-touch device (e.g., a touch pad). Such touch input devices can detect time sequences of touches or swipes (e.g., order of swipes), start and stop points of swipes, and positions of such points with respect to edges and/or size of the touch input device.

In other embodiments, input/output interfaces 208 can comprise an indirect input device (e.g., a mouse, keyboard, a camera or camera array, etc.) or another type of non-tactile device, such as an audio input device. Input/output interfaces 208 can also include one or more network interfaces to enable communications between computing device 202 and other networked devices such as other devices 202. Input/output interfaces 208 can allow a device 202 to communicate with other devices such as user input peripheral devices (e.g., a keyboard, a mouse, a pen, a game controller, a voice input device, a touch input device, gestural input device, and the like) and/or output peripheral devices (e.g., a display, a printer, audio speakers, a haptic output, and the like).

Figure 3:
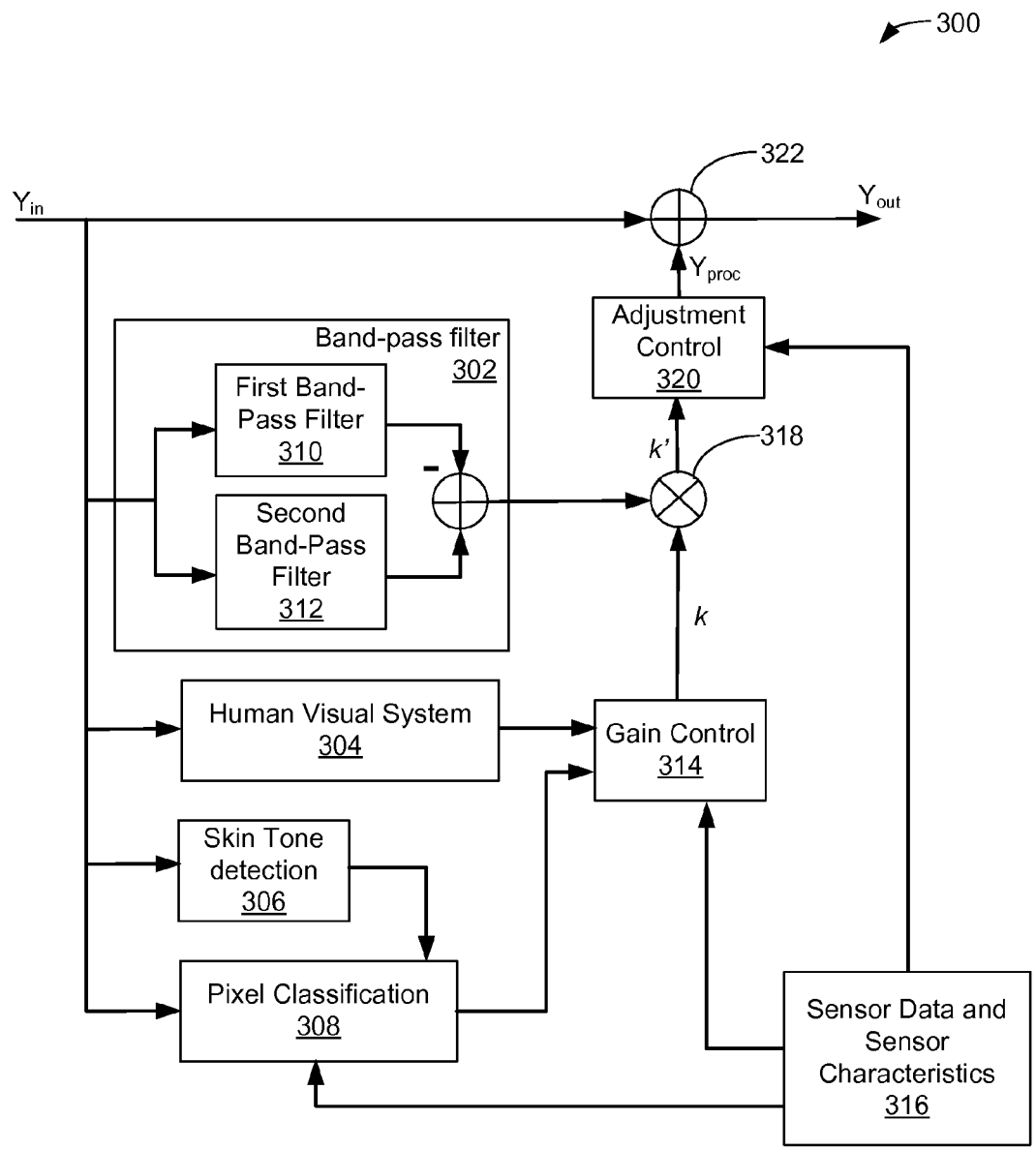
FIG. 3 is a block diagram of an image processor, according to some embodiments.

FIG. 3 is a block diagram of an image processor 300, according to some embodiments. For example, image processor 300 may be implemented by computing device 202 illustrated in FIG. 2, though claimed subject matter is not limited in this respect. Image processor 300 performs an image sharpening operation to image data of an image. Such sharpening may be applied to image data representative of areas of the image that benefit from the image sharpening, such as some fine details in the image. Image processor 300, however, can vary the amount of image sharpening applied to image data representative of portions of the image to avoid over-sharpening, which can lead to undesirable image artifacts. Thus, image processor 300 can control gain and other adjustments adaptively, based on a number of parameters that can vary across the image, as explained below.

$Y_{in}$ is image luma data generated by an imaging device, such as imaging device 204 illustrated in FIG. 2, that captured an image. The image may represent an image luma signal. Luma represents the brightness in an image (e.g., the "black-and-white" or achromatic portion of the image). For example, luma may be paired with chrominance to describe an image. $Y_{out}$ is the image data modified by image processor 300. For example, if F represents the operation that image processor 300 performs on $Y_{in}$, then $Y_{out}=F(Y_{in})=Y_{in}+Y_{proc}$, where $Y_{proc}$ is image data resulting from the various operations performed by image processor 300.

In detail, image luma data $Y_{in}$ is provided to band-pass filter block 302, human visual system (HVS) block 304, skin tone detection block 306, and pixel classification block 308. Band-pass filter block includes a first band-pass filter 310 and a second band-pass filter 312. Functionality of each of the blocks 302 through 308 is described in detail below. Gain control block 314 receives output data from HVS block 304, skin tone detection block 306, and pixel classification block 308. Gain control block 314 also receives data from sensor data and sensor characteristics (SDSC) block 316. Output data k from gain control block 314 and band-pass filter block 302 are multiplied together at operation 318 to generate data k'. Adjustment control block 320 receives data from SDSC block 316 and data k' to generate $Y_{proc}$, which is added to $Y_{in}$ at operation 322, the output of which is $Y_{out}$.

Band-pass filter block 302 may be applied to image data representative of individual pixels. Output of the band-pass filter block 302 may be the difference between output from first band-pass filter 310 and from second band-pass filter 312. In some implementations, first band-pass filter 310 and second band-pass filter 312 may each be low-pass filters having substantially different frequency responses. Output of the band-pass filter block 302 may comprise Bayer data (e.g., RGB pixel data). Such Bayer data may result from demosiacing or interpolation performed in an image sensor pipeline (ISP) that generates image data. For portions of the image having relatively high spatial frequency as compared to the image sampling rate of the ISP, aliasing may arise in a demosaic stage. Accordingly, it may be desirable to avoid sharpening high-pass components that have frequencies greater than the Nyquist frequency of the image data. Thus, band-pass filter block 302 may comprise low pass filters.

SDSC block 316 provides imaging device data to gain control block 314. Imaging device data may include information regarding, among other things, sensor(s) of the imaging device capturing an image. In particular, such information may include the amount of amplification involved during capture of the image, light conditions (e.g., ambient light levels), sensor noise amount, and so on. Such information may be provided for individual pixels, for groups of pixels, or for the entire image. In some implementations, such information may comprise metadata associated with image data of the image.

In some implementations, SDSC block 316 may comprise memory that stores imaging device data generated by the imaging device, such as imaging device 204 illustrated in FIG. 2. In other implementations, SDSC block 316 may comprise an input port that receives imaging device data generated by the imaging device. Imaging device data associated with an image may include sensor analog gain, digital gain, and/or integration time used by the imaging device while capturing the image. For example, imaging device data may be read or retrieved from sensor registers in the imaging device. During image capture, in a low light condition, relatively high sensor gain may be involved, resulting in amplification of any noise included in the raw image data. Thus, for low-light scene capture, image sharpening, which may be an amplification process, may be applied to the image relatively conservatively so as to reduce adverse image effects due to excessive amplification of the noise.

Figure 4:
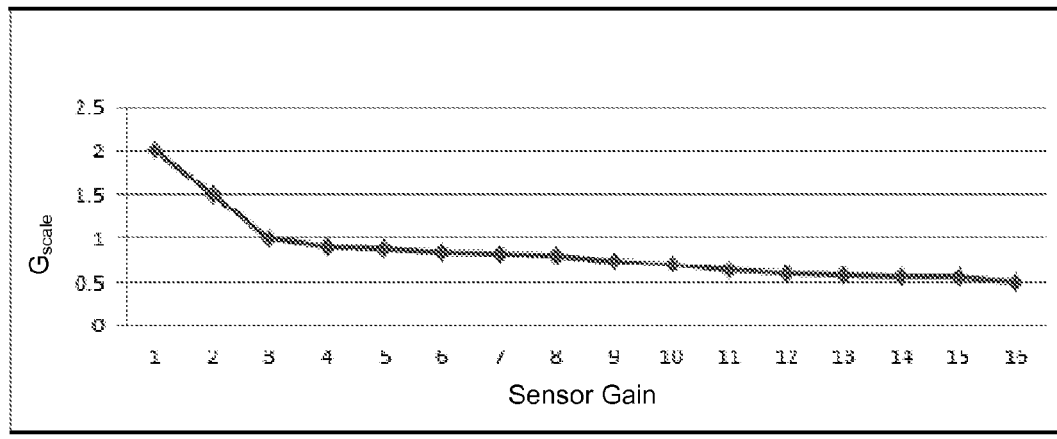
FIG. 4 illustrates a relationship between gain that can be applied to image data and gain of a sensor of an imaging device, according to some embodiments.
Figure 5:
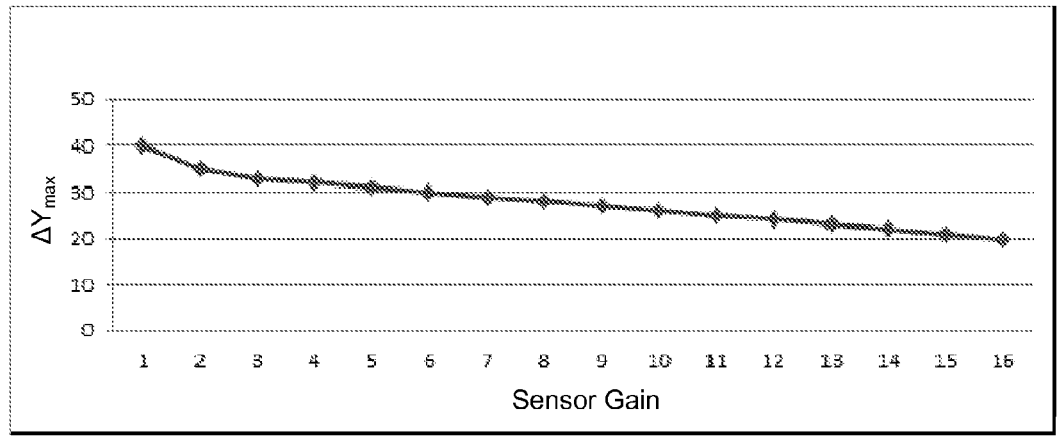
FIG. 5 illustrates a relationship between an adjustment value that can be applied to image data and gain of a sensor of an imaging device, according to some embodiments.

Imaging device data may include analog gain $g_{ana}$ and digital gain $g_{dig}$, which are gains used by the imaging device for capturing the image. Assume that $G_{scale}$ is a scale factor to increase or decrease the overall gain of a system for an image sharpening process, and that $\Delta Y_{max}$ is the maximum adjustment to input image data for the image sharpening. Both $G_{scale}$ and $\Delta Y_{max}$ may be controlled based, at least in part, on the analog and digital gain of the imaging device. Assume that sensor gain $g_{sensor} = g_{ana} * g_{dig}$. Then $G_{scale}$=function1($g_{sensor}$) and $\Delta Y_{max}$=function2($g_{sensor}$). Sensor gain may be the amplification used by CCDs, for example, to capture and integrate light of the image. Relative values for $G_{scale}$ as a function of $g_{sensor}$ is illustrated in FIG. 4. Relative values for $\Delta Y_{max}$ as a function of $g_{sensor}$ is illustrated in FIG. 5. As can be observed in the figures, both $G_{scale}$ and $\Delta Y_{max}$ decrease with increasing sensor gain. In other words, image sharpening is lessened as sensor gain increases.

Figure 6:
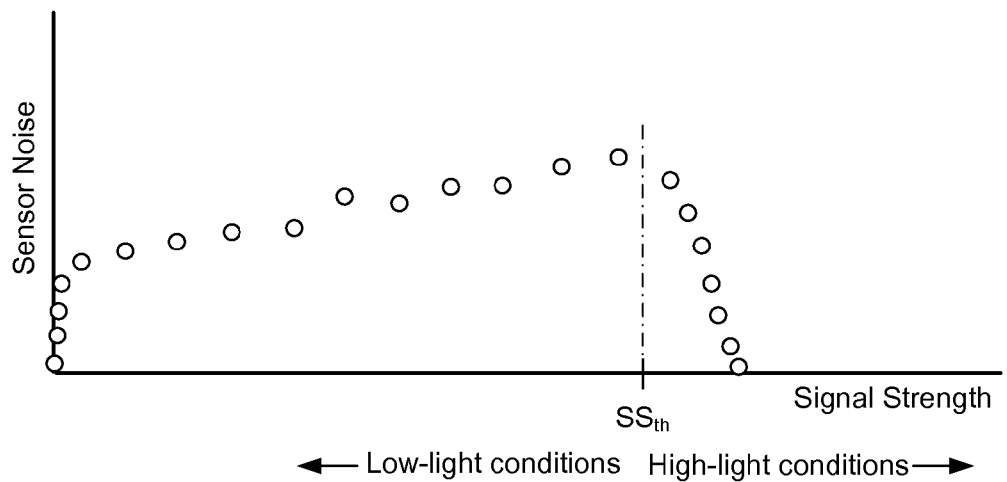
FIG. 6 illustrates a relationship between relative noise of image data and signal strength of an image sensor of an imaging device, according to some embodiments.

FIG. 6 illustrates a relationship between sensor noise of image data and signal strength of an image sensor of an imaging device, according to some embodiments. Noise of image data arises, at least in part, from light sensors (e.g., the CCDs) of the imaging device. Sensor noise tends to increase with increasing signal strength from zero to a signal saturation threshold $SS_{th}$, after which sensor noise rapidly decreases as image data starts to be saturated. In some implementations, for example, when the light sensors of the imaging device are receiving a relatively strong signal (e.g., high-light conditions), the sensor noise is relatively low. On the other hand, when the light sensors of the imaging device are receiving a relatively weak signal (e.g., low-light conditions), the sensor noise is relatively high. Accordingly, so as not to excessively amplify a noisy signal, image sharpening may be applied relatively conservatively for portions of an image generated by low-light conditions. How image sharpening is applied to various portions of an image is determined, at least in part, by gain control block 314, which receives information regarding sensor noise from SDSC block 316.

Figure 7:
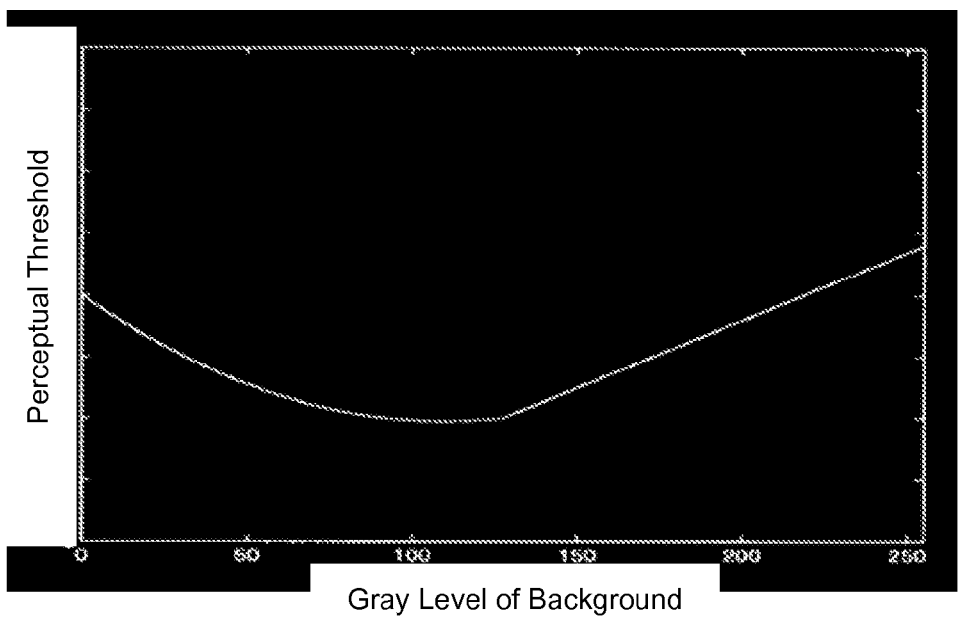
FIG. 7 illustrates a relationship between human visual perceptual threshold and gray level of the background of an image, according to some embodiments.

FIG. 7 illustrates a relationship between human visual perceptual threshold and gray level of the background of an image, according to some embodiments. The vertical axis is a relative measure of perceptual threshold and the horizontal axis is a measure of gray scale from zero (black) to 255 (white). Visual discrimination capability for the human visual system is best for a mid-gray background. In other words, perceptual threshold is lower for mid-gray background as compared to near black or white backgrounds. Thus, for example, in bright or dark portions of an image, a relatively small intensity variation (or edge) may not be easily perceived by the human visual system. On the other hand, in mid-intensity portions of the image, the human visual system is more sensitive to changes in intensity.

Figure 8:
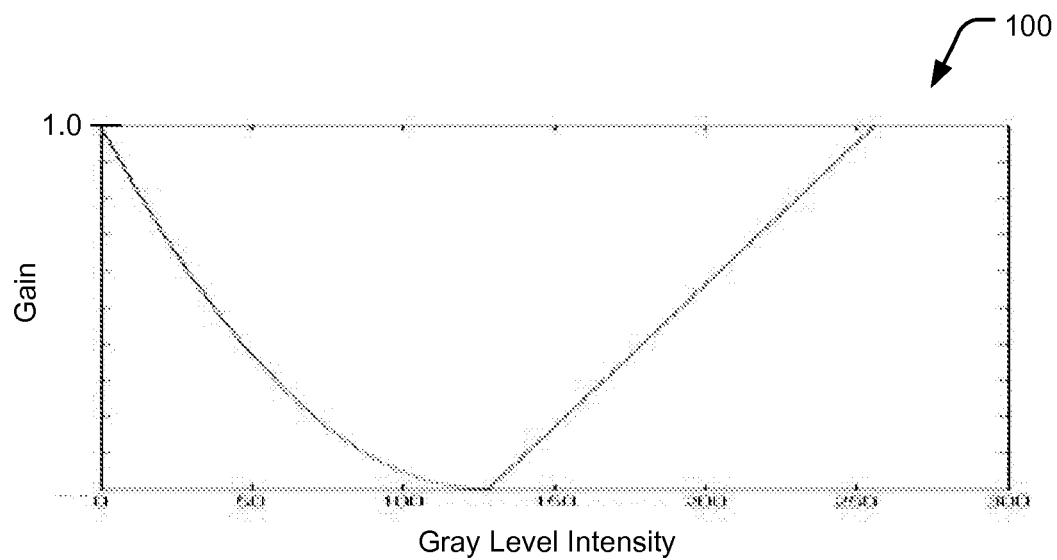
FIG. 8 illustrates a relationship between gain applied to image data and gray level of the background of an image, according to some embodiments.

FIG. 8 illustrates a relationship between gain applied to image data and gray level of the background of an image, according to some embodiments. HVS block 304 operates on image data $Y_{in}$ and provides output to gain control block 314. Operations performed by HVS block 304 are based, at least in part, on the human visual system, including human visual perceptual response. Such operations may include applying gain to image luma data $Y_{in}$ according to a gain curve such as that illustrated in FIG. 8. In a particular implementation, the gain curve can be expressed by the following equations:

$$\text{Gain}_{HVS}(y_{mean}) = 0.5 * ((y_{mean} - 128) * (y - 128)/128^2 + 1),$$
$$\text{if } y_{mean} \leq 128$$

$$\text{Gain}_{HVS}(y_{mean}) = ((y_{mean} - 256)/256) + 1, \quad \text{if } y_{mean} > 128,$$

where $y_{mean}$ is the mean value around the center pixel of the image. Claimed subject matter is not limited with respect to values or forms of the equations above, which are merely examples.

The above equations provide values for gain used for image sharpening. Such values accommodate the situation where, for example, in bright or dark portions of an image a relatively small intensity variation may not be easily perceived by the human visual system, so edges may be strongly enhanced by applying image sharpening in these portions of the image. On the other hand, because in mid-intensity portions of the image the human visual system is more sensitive to changes in intensity so that edges in these portions of the image appear sharper, edges need not be enhanced or may be sharpened conservatively. For example, an excessive amount of image sharpening may not lead to improved image quality and may instead introduce undesirable image artifacts.

Figure 9:
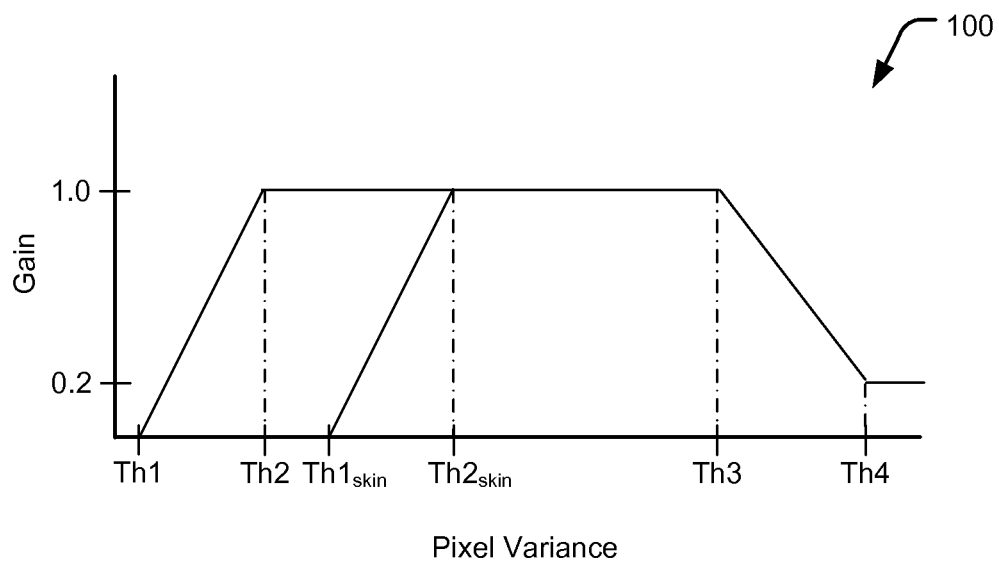
FIG. 9 illustrates a relationship between gain applied to image data and pixel variance for an image, according to some embodiments.

FIG. 9 illustrates a relationship between gain applied to image data and pixel variance for an image, according to some embodiments. Individual image pixels can be classified as being in a smooth, texture, or high contrast portion of an image. Individual image pixels can also be specified as being skin tone pixels or non-skin tone pixels. Skin-tone pixels may represent portions of an image comprising faces of persons or other body portions. Pixels may be identified as being skin-tone pixels if, for example, the color coordinates of the pixels fall within a particular color range.

In some implementations, smooth portions of an image may be identified as portions of the image that comprise pixels having color coordinates, brightness values, and/or contrast values that are within particular threshold values of one another. In smooth portions of the image, image sharpening may not be applied so as to avoid undesirable sharpening of noise. High contrast portions of an image may be identified as portions of the image that comprise pixels having contrast values that are within a particular threshold value of one another. In high contrast portions of the image, overshoot (or halo) image artifacts may occur, so careful application of image sharpening may be important. Texture portions of an image may be identified as portions of the image that comprise pixels having color coordinates, brightness values, and/or contrast values that vary by more than particular threshold values of one another. The image texture portion of the image may be primarily where image sharpening is applied to the image.

Portions of the image that include skin tone pixels may be treated differently from portions that include non-skin tone pixels when image sharpening. For example, smooth (e.g., non-sharpened) skin tone images may be more desirable as compared to sharpened skin tone images. Thus, image sharpening of skin tone pixel portions of the image may be avoided. Accordingly, if skin-tone pixels are detected in a portion of an image, image sharpening may not be applied (or relatively slightly applied) to that portion of the image.

A technique for classifying individual pixels may use localized variance measurements and sensor noise characteristics (e.g., provided by SDSC block 316). For example, in an implementation, the variance "Var" of a pixel window around the center pixel is considered. Such a pixel window can be defined as an m×m array of m rows and m columns of pixels surrounding the center pixel, where m is an integer greater than 2. $\sigma^2$ is noise variance obtained from sensor noise characteristics, such as those illustrated above in FIG. 6. Content-based gain, $Gain_{cont}$, may be expressed by the following equations, which are graphically illustrated in FIG. 9:

$Gain_{cont}=0$, if $Var \le k1*\sigma^2$ (smooth area)

$Gain_{cont}=(Var-Th1)/(Th2-Th1)$, if $k1*\sigma^2 < Var \le k2*\sigma^2$ (transition area)

$Gain_{cont}=1.0$, if $k2*\sigma^2 < Var \le k3*\sigma^2$ (texture area)

$Gain_{cont}=1-0.8*(Var-Th3)/(Th4-Th3)$, if $k3*\sigma^2 < Var \le k4*\sigma^2$ (transition area)

$Gain_{cont}=0.2$, if $Var > k4*\sigma^2$ (high contrast area)

In the above equations, k1, k2, k3, and k4 are empirically-determined parameters. Moreover, such parameters and any details of the equations may be determined by experiment or by particular constraints or conditions of a situation. Accordingly, claimed subject matter is not limited in this respect.

In FIG. 9, for portions of an image that do not include skin-tone pixels, zero gain is applied to the portions of the image for variance ranging from zero to Th1. Gain is linearly increased (though such increase need not be linear) from Th1 to Th2 and maintained at a constant value (e.g., 1.0) to a variance of Th3. Gain is reduced above Th3 and held constant beyond Th4. For portions of an image that include skin-tone pixels, zero gain is applied to the portions of the image for variance ranging from zero to Th$1_{skin}$, which is higher than Th1 for the non-skin-tone case. In other words, gain and image sharpening are delayed from Th1 to Th$1_{skin}$ so as to avoid image sharpening of skin-tone images until a relatively high threshold variance (e.g., Th$1_{skin}$) is reached. Beyond Th$1_{skin}$, gain is linearly increased (though such increase need not be linear) from Th$1_{skin}$ to Th$2_{skin}$ and maintained at a constant value (e.g., 1.0) to a variance of Th3. Gain is reduced above Th3 and held constant beyond Th4.

Skin tone detection block 306 and pixel classification block 308 may operate on image luma data $Y_{in}$ and a corresponding chroma data signal and provide output to gain control block 314. Operations performed by skin tone detection block 306 and pixel classification block 308 may include applying gain to image data $Y_{in}$ according to gain curves such as those illustrated in FIG. 9. Pixel classification block 308 may operate only on image luma data $Y_{in}$, and may provide output to gain control block 314.

Figure 10:
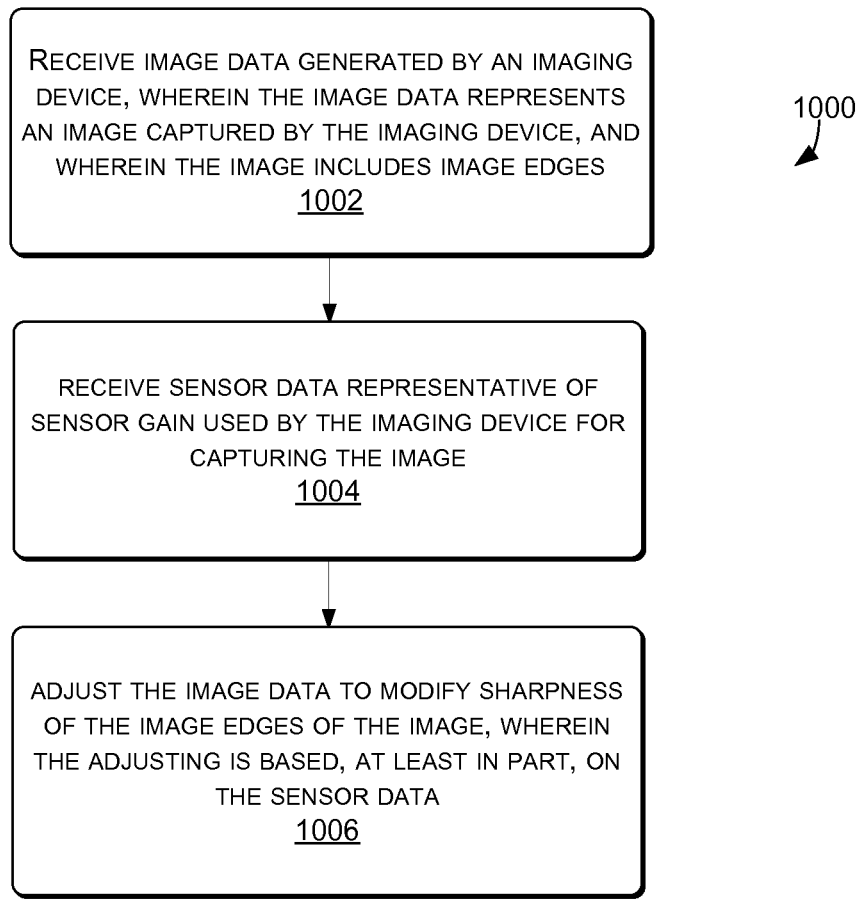
FIG. 10 is a flow diagram of a process for sharpening features of an image, according to some embodiments.

FIG. 10 is a flow diagram of a process 1000 for sharpening features of an image, according to some embodiments. For example, process 1000 may be performed by computing device 202 illustrated in FIG. 2. At block 1002, image data generated by an imaging device is received. The image data may represent an image captured by the imaging device. Also, the image may include image edges, such as those illustrated in FIG. 1, for example. At block 1004, sensor data (e.g., metadata) representative of sensor gain used by the imaging device for capturing the image is received. At block 1006, the image data is adjusted to modify sharpness of the image edges of the image. The adjusting may be based, at least in part, on the sensor data, for example.

As used herein, the term "module" or "block" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

The description incorporates use of the phrases "in an embodiment," or "in various embodiments," which may each refer to one or more of the same or different embodiments. Furthermore, the terms "comprising," "including," "having," and the like, as used with respect to embodiments of the present disclosure, are synonymous.

Various operations may have been described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Although specific embodiments have been illustrated and described herein, it is noted that a wide variety of alternate and/or equivalent implementations may be substituted for the specific embodiment illustrated and described without departing from the scope of the present disclosure. The present disclosure covers all methods, apparatus, and articles of manufacture fairly falling within the scope of the appended claims either literally or under the doctrine of equivalents. This application is intended to cover any adaptations or variations of the embodiment disclosed herein. Therefore, it is manifested and intended that the present disclosure be limited only by the claims and the equivalents thereof.

What is claimed is:

1. A method comprising:
    receiving image data generated by an imaging device, wherein the image data represents an image captured by the imaging device, and wherein the image includes image edges;
    detecting skin tone in one or more portions of the image;
    providing the image data to a band-pass filter to produce filtered image data;
    in a process that is performed in parallel with providing the image data to the band-pass filter:
        modifying the image data based, at least in part, on human visual response data to produce first modified image data, and
        modifying the image data based, at least in part, on the detected skin tone to produce second modified image data;
    combining (i) the filtered image data, (ii) the first modified image data, and (iii) the second modified image data to produce third modified image data;
    receiving sensor data used by the imaging device for capturing the image; and
    based, at least in part, on the sensor data, adjusting the third modified image data to modify sharpness of the image edges of the image.

2. The method of claim 1, wherein sensor gain is related to the sensor data, and wherein the sensor gain comprises analog gain, digital gain, or integration time used by the imaging device for capturing the image.

3. The method of claim 1, wherein the band-pass filter comprises a first low pass filter and a second low pass filter, and further comprising:
applying the first low pass filter to the image data to generate first filtered image data;
applying the second low pass filter to the image data to generate second filtered image data; and
generating band-pass image data based, at least in part, on a difference between the first filtered image data and the second filtered image data, wherein the first low pass filter and the second low pass filter have frequency responses different from one another.

4. The method of claim 1, wherein adjusting the third modified image data to modify sharpness of the image edges of the image is further based, at least in part, on image gray-scale of portions of the image.

5. The method of claim 1, further comprising:
based, at least in part, on smoothness, texture, or contrast of the one or more portions of the image, classifying one or more portions of the image; and
adjusting the image data to modify sharpness of the image edges of the image based, at least in part, on the classifying.

6. The method of claim 1, wherein adjusting the third modified image data to modify sharpness of the image edges of the image is further based, at least in part, on contrast of one or more portions of the image.

7. The method of claim 1, wherein the sensor data used by the imaging device for capturing the image comprises metadata associated with image data of the image.

8. A system comprising:
an imaging device; and
a processor configured to
receive image data generated by the imaging device, wherein the image data represents an image captured by the imaging device, and wherein the image includes image edges;
detect skin tone in one or more portions of the image;
provide the image data to a band-pass filter to produce filtered image data;
in a process that is performed in parallel with providing the image data to the band-pass filter:
modify the image data based, at least in part, on human visual response data to produce first modified image data, and
modify the image data based, at least in part, on the detected skin tone to produce second modified image data;
combine (i) the filtered image data, (ii) the first modified image data, and (iii) the second modified image data to produce third modified image data;
receive sensor data used by the imaging device for capturing the image; and
adjust the third modified image data to modify sharpness of the image edges of the image, wherein the adjusting is based, at least in part, on the sensor data.

9. The system of claim 8, wherein sensor gain is related to the sensor data, and wherein the sensor gain comprises analog gain, digital gain, or integration time used by the imaging device for capturing the image.

10. The system of claim 8, wherein the band-pass filter comprises a first low pass filter and a second low pass filter, and wherein the processor is further configured to:
apply the first low pass filter to the image data to generate first filtered image data;
apply the second low pass filter to the image data to generate second filtered image data; and
generate band-pass image data based, at least in part, on a difference between the first filtered image data and the second filtered image data, wherein the first low pass filter and the second low pass filter have frequency responses different from one another.

11. The system of claim 8, wherein the processor is further configured to adjust the third modified image data to modify sharpness of the image edges of the image based, at least in part, on image gray-scale of portions of the image.

12. The system of claim 8, wherein the processor is further configured to:
classify one or more portions of the image based, at least in part, on smoothness, texture, or contrast of the one or more portions of the image; and
adjust the image data to modify sharpness of the image edges of the image based, at least in part, on the classifying.

13. The system of claim 8, wherein the processor is further configured to adjust the third modified image data to modify sharpness of the image edges of the image based, at least in part, on contrast of one or more portions of the image.

14. The system of claim 8, wherein classifying the one or more portions of the image is further based, at least in part, on the detected skin tone.

15. A computer-readable non-transitory storage medium storing computer-executable instructions that, when executed by a processor, configure the processor to perform operations comprising:
receiving image data generated by an imaging device, wherein the image data represents an image captured by the imaging device, and wherein the image includes image edges;
detecting skin tone in one or more portions of the image;
providing the image data to a band-pass filter to produce filtered image data;
in a process that is performed in parallel with providing the image data to the band-pass filter:
modifying the image data based, at least in part, on human visual response data to produce first modified image data, and
modifying the image data based, at least in part, on the detected skin tone to produce second modified image data;
combining (i) the filtered image data, (ii) the first modified image data, and (iii) the second modified image data to produce third modified image data;
receiving sensor data used by the imaging device for capturing the image; and
based, at least in part, on the sensor data, adjusting the third modified image data to modify sharpness of the image edges of the image.

16. The computer-readable non-transitory storage medium of claim 15, wherein sensor gain is related to the sensor data, and wherein the sensor gain comprises analog gain, digital gain, or integration time used by the imaging device for capturing the image.

17. The computer-readable non-transitory storage medium of claim 15, the operations further comprising:
applying the first low pass filter to the image data to generate first filtered image data;
applying the second low pass filter to the image data to generate second filtered image data; and
generating band-pass image data based, at least in part, on a difference between the first filtered image data and the second filtered image data, wherein the first low pass filter and the second low pass filter have frequency responses different from one another.

18. The computer-readable non-transitory storage medium of claim 15, the operations further comprising:
    based, at least in part, on gray-scale of portions of the image, adjusting the third modified image data to modify sharpness of the image edges of the image.

19. The computer-readable non-transitory storage medium of claim 15, the operations further comprising:
    classifying one or more portions of the image based, at least in part, on smoothness, texture, or contrast of the one or more portions of the image; and
    based, at least in part, on the classifying, adjusting the image data to modify sharpness of the image edges of the image.

20. The computer-readable non-transitory storage medium of claim 15, the operations further comprising:
    reading the sensor data used by the imaging device for capturing the image from sensor registers in the imaging device.

* * * * *